United States Patent
Osawa et al.

[11] Patent Number: 6,038,345
[45] Date of Patent: Mar. 14, 2000

[54] APPARATUS FOR ENCODING/DECODING IMAGE DATA

[75] Inventors: Hidefumi Osawa, Kawaguchi; Yasuji Hirabayashi, Kawasaki, both of Japan

[73] Assignee: Canon Kabushiki Kaisha, Tokyo, Japan

[21] Appl. No.: 08/927,263

[22] Filed: Sep. 11, 1997

Related U.S. Application Data

[63] Continuation of application No. 08/450,995, May 25, 1995, abandoned.

[30] Foreign Application Priority Data

May 26, 1994 [JP] Japan .................................. 6-112805
Feb. 2, 1995 [JP] Japan .................................. 7-016119

[51] Int. Cl.[7] .............................. G06K 9/36; G06K 9/46
[52] U.S. Cl. ..................... 382/232; 382/235; 382/236; 382/238; 382/248
[58] Field of Search .................................. 382/233, 235, 382/236, 248, 250, 238, 232; 348/400, 401, 402, 403, 416, 420, 430; 358/430, 432, 433, 261.3

[56] References Cited

U.S. PATENT DOCUMENTS

| | | | |
|---|---|---|---|
| 4,792,851 | 12/1988 | Mochizuki | 348/402 |
| 4,797,742 | 1/1989 | Sugiyama et al. | 348/407 |
| 5,150,432 | 9/1992 | Ueno et al. | 382/250 |
| 5,295,201 | 3/1994 | Yokohama et al. | 382/236 |
| 5,315,326 | 5/1994 | Sugiyama | 348/416 |
| 5,327,232 | 7/1994 | Kim | 348/412 |
| 5,357,281 | 10/1994 | Ikeda et al. | 348/401 |
| 5,369,437 | 11/1994 | Koga et al. | 348/401 |
| 5,384,849 | 1/1995 | Jeong | 348/420 |
| 5,450,132 | 9/1995 | Harris et al. | 348/418 |
| 5,467,133 | 11/1995 | Lee | 348/416 |
| 5,473,704 | 12/1995 | Abe | 382/235 |
| 5,537,147 | 7/1996 | Tahara | 348/400 |
| 5,557,330 | 9/1996 | Astle | 348/394 |

*Primary Examiner*—Leo Boudreau
*Assistant Examiner*—Dmitry A. Novik
*Attorney, Agent, or Firm*—Fitzpatrick, Cella, Harper & Scinto

[57] ABSTRACT

An image processing apparatus includes an input unit for inputting image data having undergone orthogonal transformation, a generation unit for generating interframe difference image data, of adjacent frames with respect to the image data input by the input unit, using orthogonal transform coefficients, and an encoding unit for encoding the image data output from the generation unit. An image processing apparatus includes an input unit for inputting encoded data obtained by performing block encoding of interframe difference data using orthogonal transformation, a decoding unit for decoding the encoded data input by the input unit into orthogonal transform coefficient difference data, and an addition unit for adding the orthogonal transform coefficient data of a block different from a processed block to the difference data decoded by the decoding unit.

17 Claims, 12 Drawing Sheets

DIGITAL
IMAGE DATA

DCT
COEFFICIENT
DATA

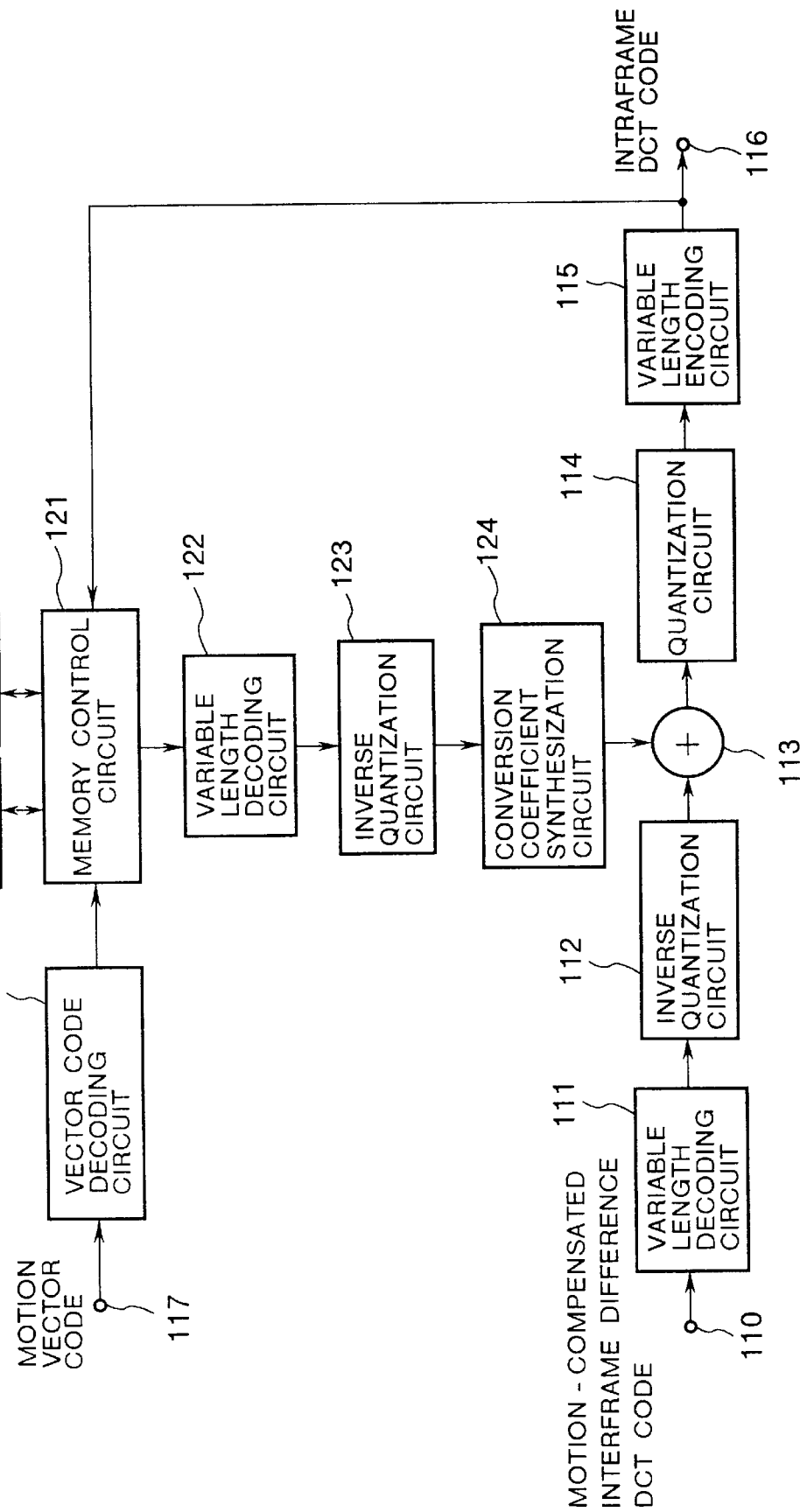

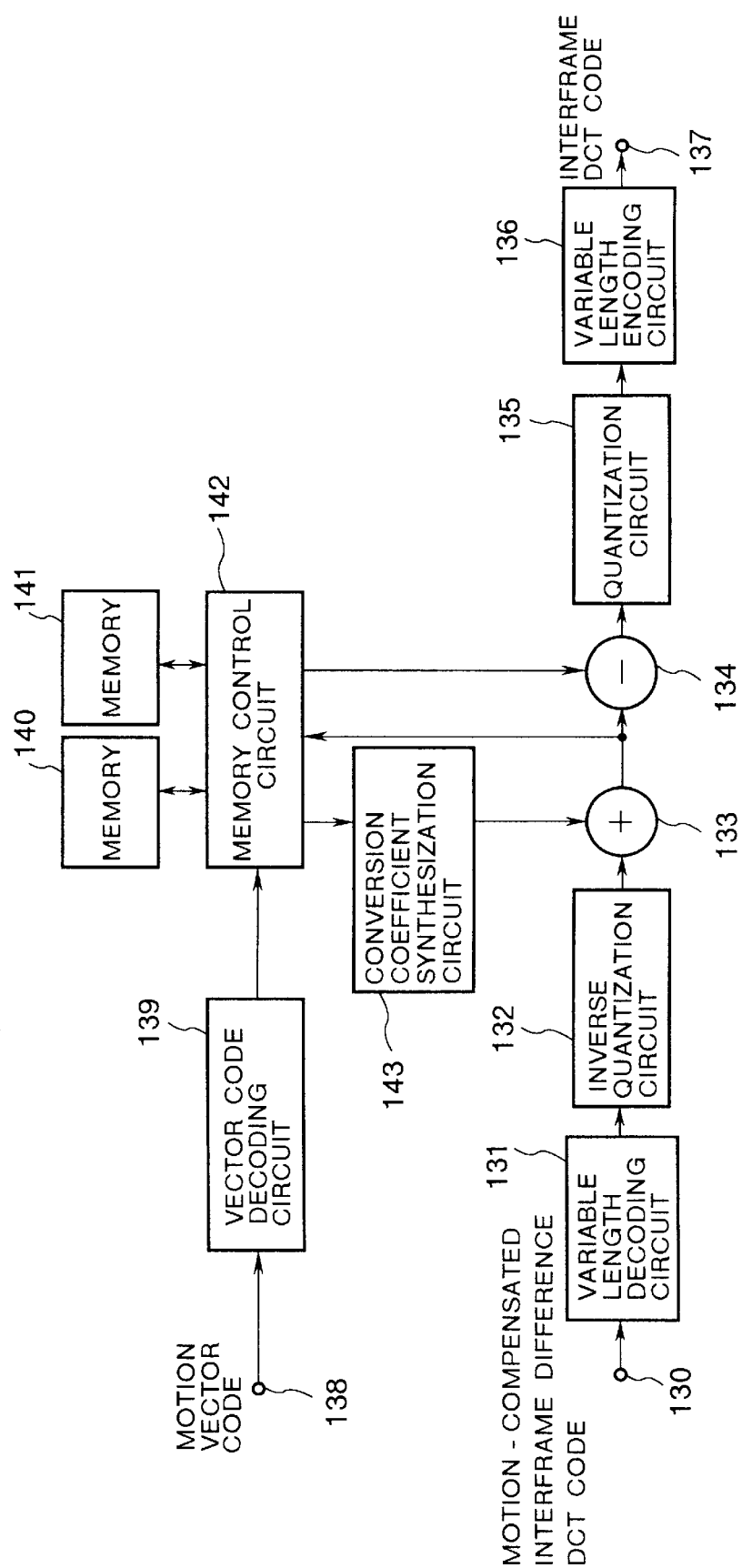

APPARATUS FOR ENCODING/DECODING IMAGE DATA

This application is a continuation of application Ser. No. 08/450,995, filed May 25, 1995, now abandoned.

BACKGROUND OF THE INVENTION

1. Field of the Invention

The present invention relates to an image processing apparatus associated with encoding/decoding processing of image data.

2. Related Background Art

As conventional encoding schemes for digital motion images, the following two schemes are known:

(1) an intraframe/intrafield (intraframe) encoding scheme of encoding image data in units of frames/fields; and (2) an interframe/interfield (interframe) encoding scheme of encoding differences between frames/fields.

In the intraframe/intrafield encoding scheme, since each frame/field is encoded independently, edit processing can be easily performed in units of frames/fields.

In addition, the encoding and decoding algorithms are simple and hence can be easily realized by hardware and software. However, one drawback of this scheme is that the compression ratio is not very high.

In the interframe/interfield encoding scheme, a high compression ratio can be realized as compared with the intraframe/intrafield encoding scheme. However, edit processing performed in units of frames is complicated, and the hardware for coding and decoding operations is complicated.

In a conventional apparatus, in changing the encoding scheme, encoded data is completely decoded first, and the decoded data is then encoded again by a desired encoding scheme.

In such a conventional apparatus, in switching the encoding scheme, two types of encoders, i.e., an intraframe/intrafield encoder and an interframe/interfield encoder, are required. Consequently, the circuit size is large, and the cost is high. Furthermore, encoding processing is complicated.

In addition, quantization errors occur in the process of converting encoded data into completely decoded image data, resulting in a deterioration in image quality.

SUMMARY OF THE INVENTION

The present invention has been made in consideration of the above situation, and has as its object to provide an image processing apparatus which can generate interframe encoded data from intraframe encoded data with a simple arrangement while suppressing a deterioration in image quality.

In order to achieve the above object, according to the first aspect of the present invention, there is provided an image processing apparatus comprising input means for inputting image data having undergone orthogonal transformation, generation means for generating interframe difference image data, of adjacent frames with respect to the image data input by the input means, using orthogonal transform coefficients, and encoding means for encoding the image data output from the generation means.

It is another object of the present invention to provide an image processing apparatus which can generate intraframe encoded data from interframe encoded data with a simple arrangement while suppressing a deterioration in image quality.

In order to achieve the above object, according to another aspect of the present invention, there is provided an image processing apparatus comprising input means for inputting encoded data obtained by performing block encoding of interframe difference data using orthogonal transformation, decoding means for decoding the encoded data input by the input means into orthogonal transform coefficient difference data, and addition means for adding orthogonal transform coefficient data of a block different from a processed block to the difference data decoded by the decoding means.

Other objects, features and advantages of the invention will become apparent from the following detailed description taken in conjunction with the accompanying drawings.

BRIEF DESCRIPTION OF THE DRAWINGS

FIG. 11 is a block diagram showing an image processing apparatus according to the fifth embodiment of the present invention; and FIG. 12 is a block diagram showing an image processing apparatus according to the sixth embodiment of the present invention.

DETAILED DESCRIPTION OF THE PREFERRED EMBODIMENTS

For the sake of descriptive convenience, in the following embodiments, encoding/decoding processing is performed in units of frames. However, the objects of the present invention can be achieved even if such processing is performed in units of fields.

The first embodiment of the present invention will be described below.

An encoding method of generating intraframe encoded data will be described with reference to FIG. 1.

Figure 1:
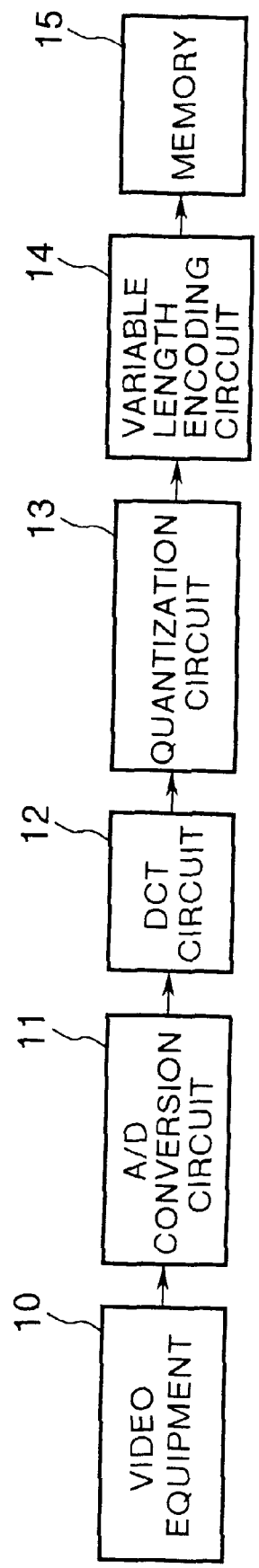
FIG. 1 is a block diagram showing an image processing apparatus for performing intraframe encoding processing.

Referring to FIG. 1, a video signal of each frame from a video equipment 10 such as a video camera is converted into digital data by an A/D conversion circuit 11.

The digital image data is input to a DCT (Discrete Cosine Transform) circuit 12. In the DCT circuit 12, the data is subjected to discrete cosine transformation in units of M×N (M and N are integers) pixel blocks so as to be transformed into frequency data, thereby generating DCT coefficient values.

The DCT coefficient values obtained by the DCT circuit 12 are linearly quantized by a quantization circuit 13 to reduce the data amount.

The data quantized by the quantization circuit 13 is encoded by a variable length encoding circuit 14. This encoded data is recorded in a memory 15 as a recording medium, e.g., a disk.

An image processing apparatus for generating interframe encoded data from encoded data obtained by an intraframe encoding method like the one shown in FIG. 1 will be described next.

Figure 2:
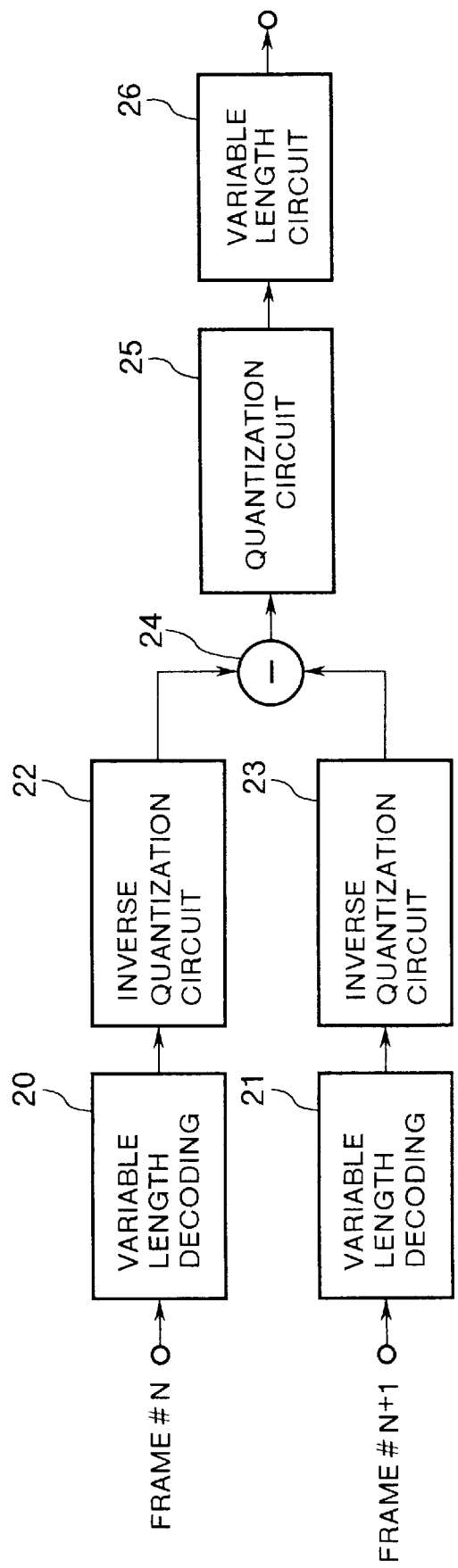
FIG. 2 is a block diagram showing an image processing apparatus according to the first embodiment of the present invention.

Referring to FIG. 2, encoded data of a given frame, #N and the next frame, #N+1, are respectively input to variable length decoding circuits 20 and 21 to be decoded. The data are then restored to DCT coefficient values by inverse quantization circuits 22 and 23.

A subtracter 24 then subtracts the DCT coefficient values of frame #N from the DCT coefficient values of frame #N+1 to generate interframe difference DCT coefficient values.

The difference DCT coefficient values obtained by the subtracter 24 are quantized again by a quantization circuit 25. The data quantized by the quantization circuit 25 is encoded by a variable length encoding circuit 26.

The above arrangement is employed for the sake of descriptive convenience. According to another arrangement, DCT coefficient data obtained after inverse quantization of one frame is stored in a frame memory or the like to reduce the number of pairs of variable length decoding circuits and inverse quantization circuits to one.

Figure 3:
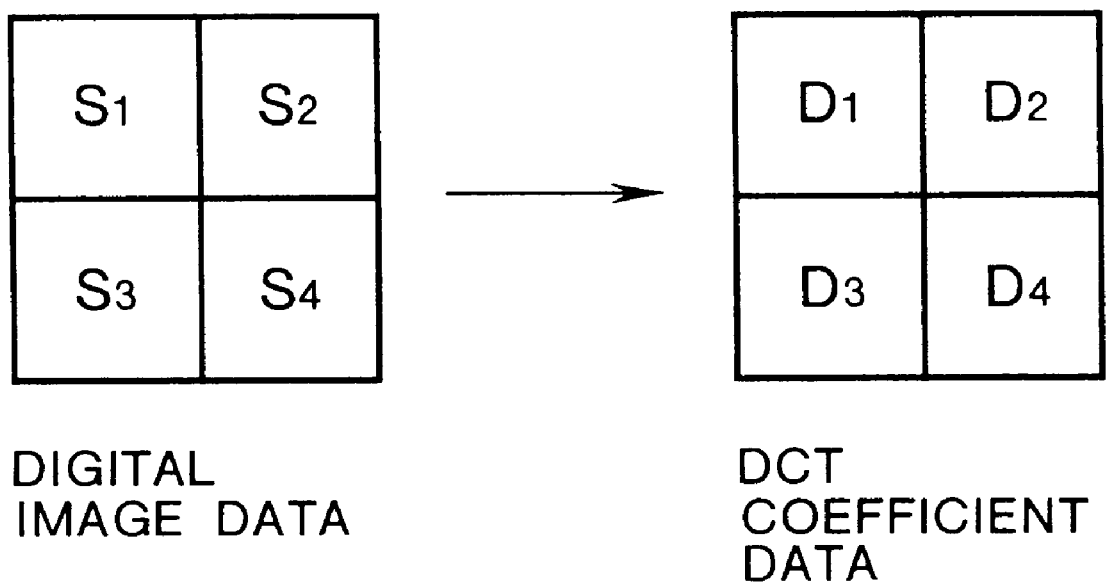
FIG. 3 is a view for explaining a method of calculating DCT coefficients in a (2×2) pixel block.

FIG. 3 is a view for explaining that the difference values between DCT coefficient values coincides with DCT coefficient values obtained by generating a difference signal using two non-encoded image data.

For the sake of descriptive convenience, DCT processing performed in units of (2×2) pixel blocks will be described below.

Referring to FIG. 3, DCT processing of the respective digital data, S1, S2, S3, and S4, of a (2×2) pixel block yields DCT coefficient values, D1, D2, D3, and D4.

The respective DCT coefficients are defined as follows:

$$D1=(S1+S2+S3+S4)/4$$

$$D2=(S1-S2+S3-S4)/4$$

$$D3=(S1+S2-S3-S4)/4$$

$$D4=(S1-S2-S3+S4)/4$$

Figure 4:
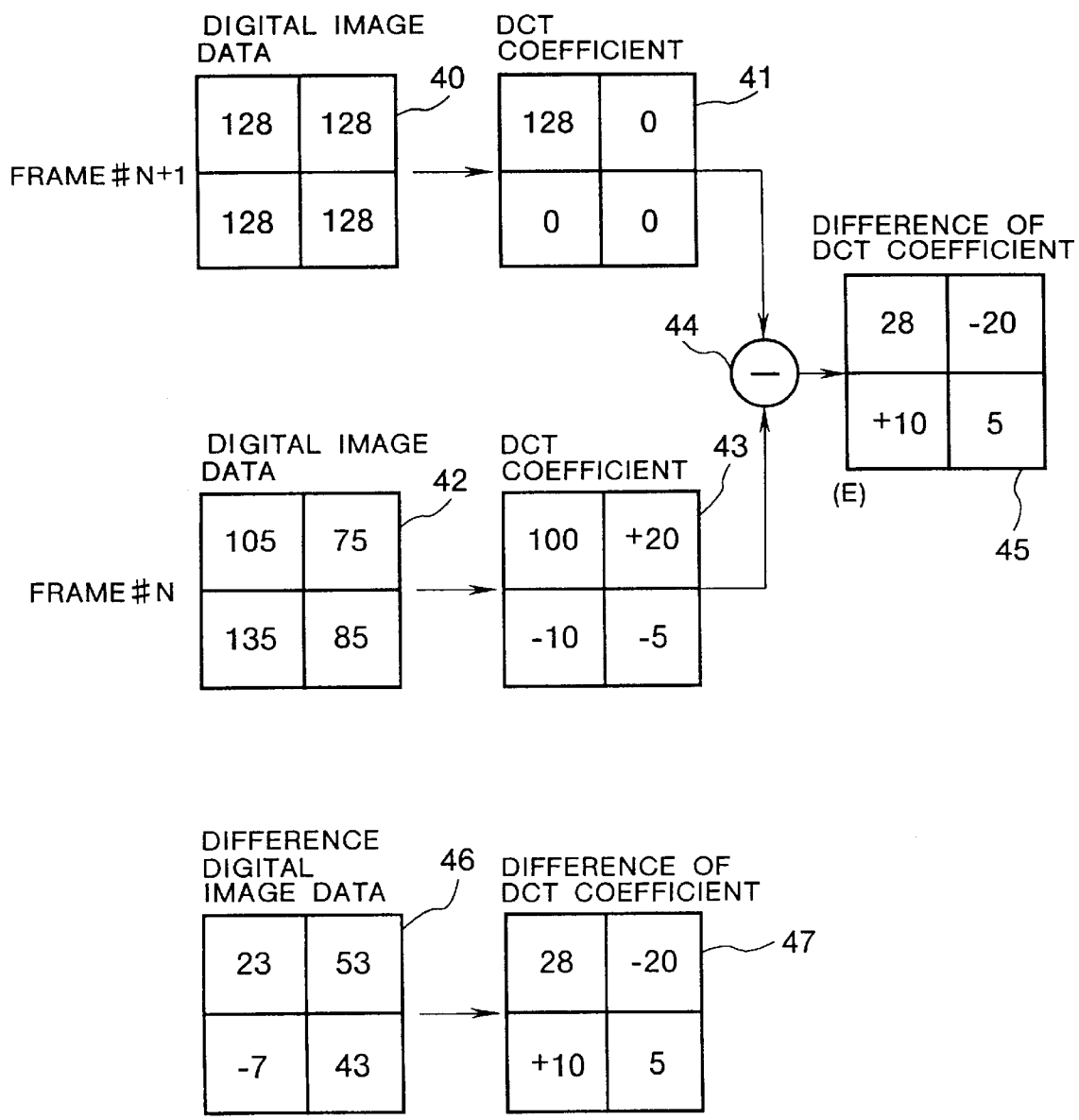
FIG. 4 is a view for explaining the encoding operation of the image processing apparatus in FIG. 2.

Assume that the digital image of frame #N+1 is constituted by "128", "128", "128", and "128", as indicated by a block 40 in FIG. 4.

When DCT processing of the block 40 is performed, data constituted by "128", "0", "0", and "0" is obtained according to the above equations, as indicated by a block 41.

Assume that the digital image data of frame #N is constituted by "105", "75", "135", and "85", as indicated by a block 42.

When DCT processing of the block 42 is performed, the data constituted by "100", "20", "−10", and "−5" is obtained according to the above equations, as indicated by a block 43.

When the differences of the respective coefficient values are calculated by a subtracter 44, "28", "−20", "10", and "5" are obtained, as indicated by a block 45.

The difference data between the digital image data of frame #N+1 and frame #N is constituted by "23", "53", "−7", and "43", as indicated by a block 46. DCT coefficient values obtained by DCT processing of this difference block data are "28", "−20", "10", and "5", as indicated by a block 47.

The blocks 45 and 47 have equal values. That is, data encoded by calculating the differences between DCT coefficient values is identical to data encoded by calculating the differences between digital image data.

The second embodiment of the present invention will be described next.

Figure 5:
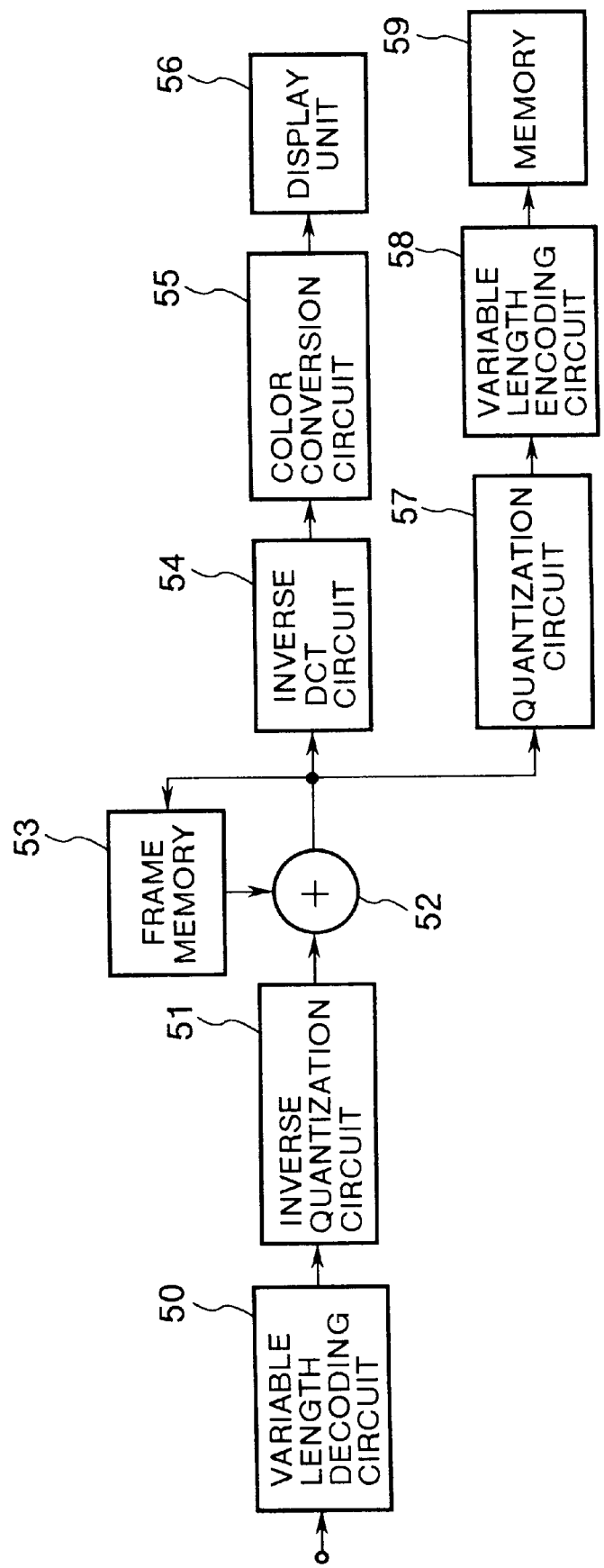
FIG. 5 is a block diagram showing an image processing apparatus according to the second embodiment of the present invention.

FIG. 5 is a block diagram showing an image processing apparatus for decoding and re-encoding interframe encoded image data.

Difference encoded data is decoded into quantized data after quantization by a variable length decoding circuit 50. The data is then inversely quantized by an inverse quantization circuit 51, and difference data of DCT coefficient values is generated.

In an adder 52, the DCT coefficient values of the preceding frame, output from a frame memory 53, are added to the difference DCT coefficient values output from the inverse quantization circuit 51, thereby generating the DCT coefficient values of the current frame.

These DCT coefficient values are stored in the frame memory 53 and are also restored to image data by an inverse DCT circuit 54. The image data is then subjected to color conversion in a color conversion circuit 55 and is displayed on a display unit.

In addition, the DCT coefficient values output from the adder 52 may be quantized again by a quantization circuit 57 and encoded again by a variable length encoding circuit 58. The resultant data may be recorded in a memory 59 such as a disk. With this operation, interframe encoded data can be efficiently converted into intraframe encoded data.

The third embodiment of the present invention will be described next.

In performing interframe encoding, a higher compression ratio can be attained without degrading the image quality by using a motion compensation technique. In this technique, in consideration of translation of an object in an image, a position where the difference between the current block and a neighboring block is minimized is detected in addition to the same position as that of the preceding frame, and data obtained by encoding the difference data between the position information (vector data) and the block is supplied.

An image processing apparatus for converting intraframe encoded data into encoded data by efficiently performing inter-motion compensation frame encoding will be described next with reference to FIG. 6.

Figure 6:
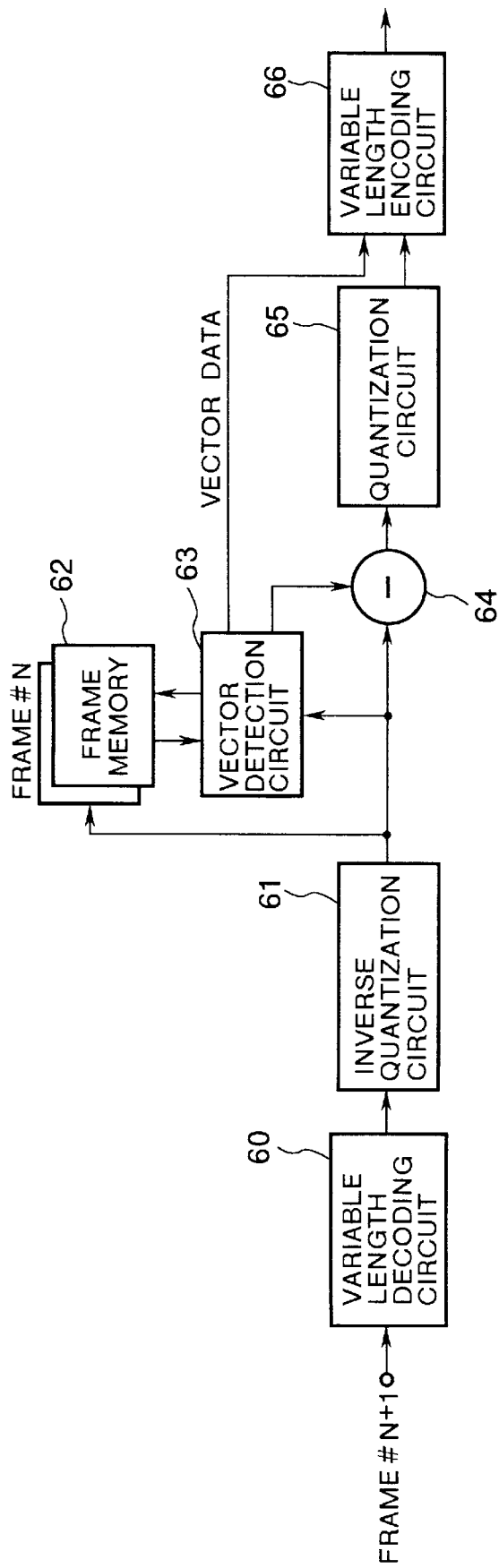
FIG. 6 is a block diagram showing an image processing apparatus according to the third embodiment of the present invention.

Referring to FIG. 6, encoded data of frame #N+1 is decoded into quantized data (of each block) after quantization by a variable length decoding circuit 60. The resultant data is further restored to DCT coefficient values by an inverse quantization circuit 61.

The DCT coefficient data output from the inverse quantization circuit 61 is input to a frame memory 62.

DCT coefficient data of frame #N is recorded in the frame memory 62.

The DCT coefficient data output from the inverse quantization circuit 61 is input to a vector detection circuit 63.

In calculating the differences between the DCT coefficient data of frame #N and the DCT coefficient data of frame #N+1, the vector detection circuit 63 detects a block position where the difference data is reduced. The vector detection circuit 63 supplies the resultant data, as vector data, to a variable length encoding circuit 66.

In addition, the vector detection circuit 63 outputs the DCT coefficient data of a block at a position where the difference is minimized.

A subtracter 64 subtracts the DCT coefficient values of the block of frame #N, detected by the vector detection circuit 63, from the DCT coefficient values of the processed block of frame #N+1 so as to generate interframe difference DCT coefficient values.

The block data output from the subtracter 64 is quantized again by a quantization circuit 65.

The re-quantized data is subjected to variable length encoding, together with the vector data, in the variable length encoding circuit 66. Note that variable length encoding of a motion vector can be performed by a known scheme such as a scheme of assigning a variable length code in accordance with the frequency of occurrence of the vector.

Figure 7:
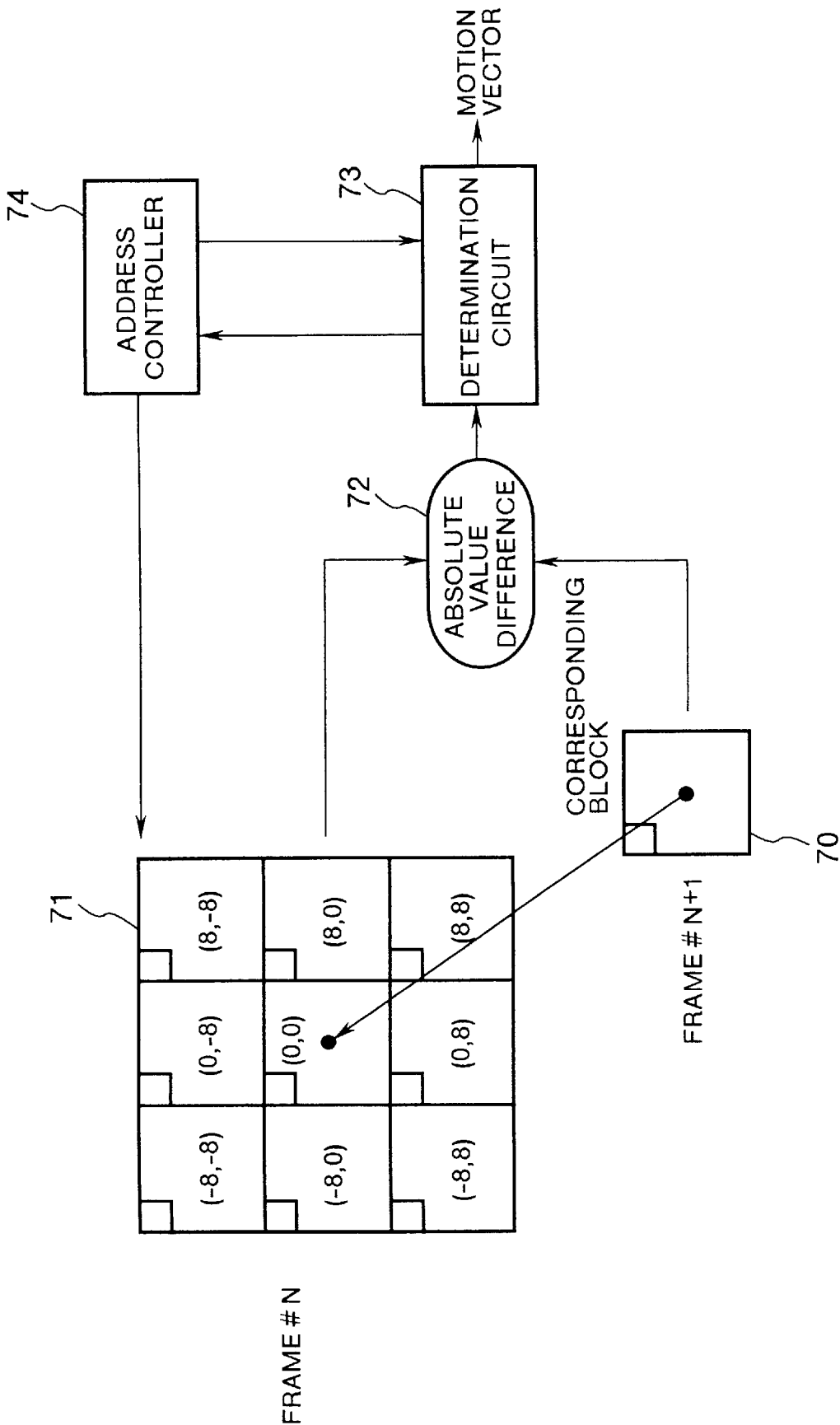
FIG. 7 is a view for explaining the operation of a motion detection circuit 64 in FIG. 6.

FIG. 7 is a view for explaining processing performed by the vector detection circuit 63.

Referring to FIG. 7, an address controller 74 controls a frame memory to output the DCT coefficients of each block.

An absolute value difference circuit 72 calculates the coefficient differences between block data 70 of the DCT coefficients of frame #N+1 and each of nine block data 71 of the DCT coefficients of frame #N read out by the address controller 74.

A determination circuit 73 determines from the address controller 74, on the basis of the absolute difference data of each block output from the absolute value difference circuit 72, the position of a block where the absolute difference data is minimized. The determination circuit 73 receives, from the address controller 74, the block position information indicating the position where the absolute difference data is minimized, and outputs a motion vector on the basis of the position information.

Note that the block in the center of the nine blocks of frame #N coincides with the position of the current block of frame #N+1.

In this embodiment, as shown in FIG. 7, there are nine motion vectors, i.e., (−8, −8), (0, −8), (8, −8), (−8, 0), (0, 0), (8, 0), (−8, 8), (0, 8), and (8, 8). However, the present invention is not limited to this.

Figure 8:
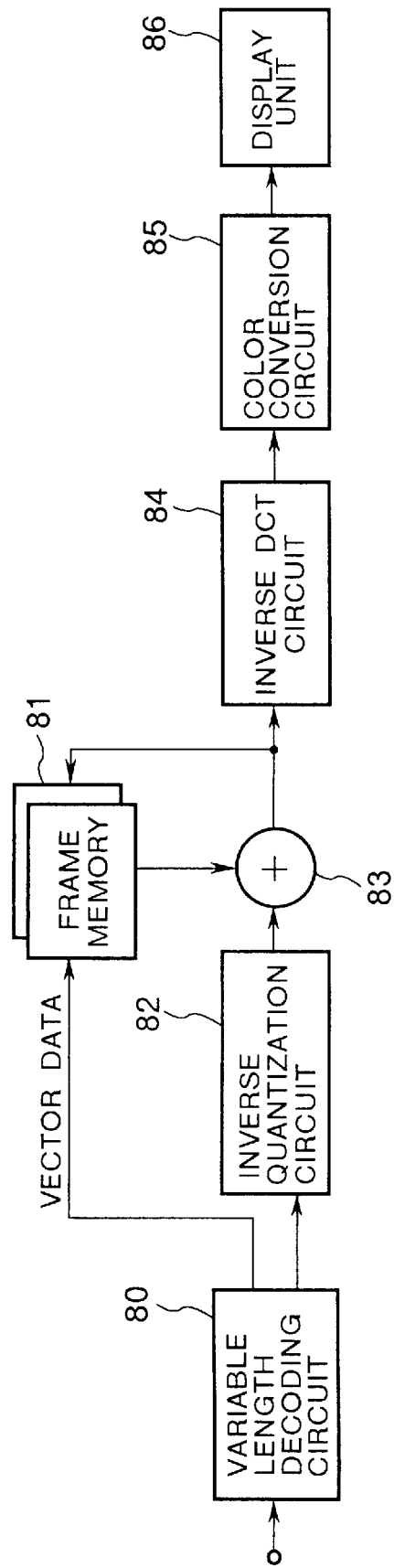
FIG. 8 is a block diagram showing an image processing apparatus for decoding image data encoded by the image processing apparatus in FIG. 6.

FIG. 8 is a block diagram showing an image processing apparatus for decoding data encoded by the apparatus in FIG. 5.

Referring to FIG. 8, input encoded data is restored to quantized data after quantization by a variable length decoding circuit 80. The data is then inversely quantized by an inverse quantization circuit 82 to generate difference data of DCT coefficient values.

The variable length decoding circuit 80 also decodes the input encoded data into motion vector data and outputs the data to a frame memory 81.

The frame memory 81 outputs the DCT coefficient values of the preceding frame on the basis of the motion vector data.

An adder 83 adds the DCT coefficient data, output from the inverse quantization circuit 82, to the DCT coefficient data of the preceding frame, output from the frame memory 81, to generate the DCT coefficient values of the processed frame.

The DCT coefficient values output from the adder 83 are stored in the frame memory 81 and are also output to an inverse DCT circuit 84. The DCT coefficient values are then restored to image data by the inverse DCT circuit 84. Furthermore, color conversion processing of the image data output from the inverse DCT circuit 84 is performed by a color conversion circuit 85 in accordance with the characteristics of a display unit 86. The resultant image data is displayed on the display unit 86.

The fourth embodiment of the present invention will be described next.

An image processing apparatus for efficiently converting data encoded by inter-frame motion compensation frame encoding into intraframe encoded data will be described with reference to FIG. 9. In this embodiment, encoding processing is performed in units of (8×8) pixel blocks. Assume that input and output encoded data undergo DCT processing, quantization, and variable length encoding. Data transmitted through a transmission line is separated into a motion vector code and a variable length code by a bit stream decoder (not shown).

Figure 9:
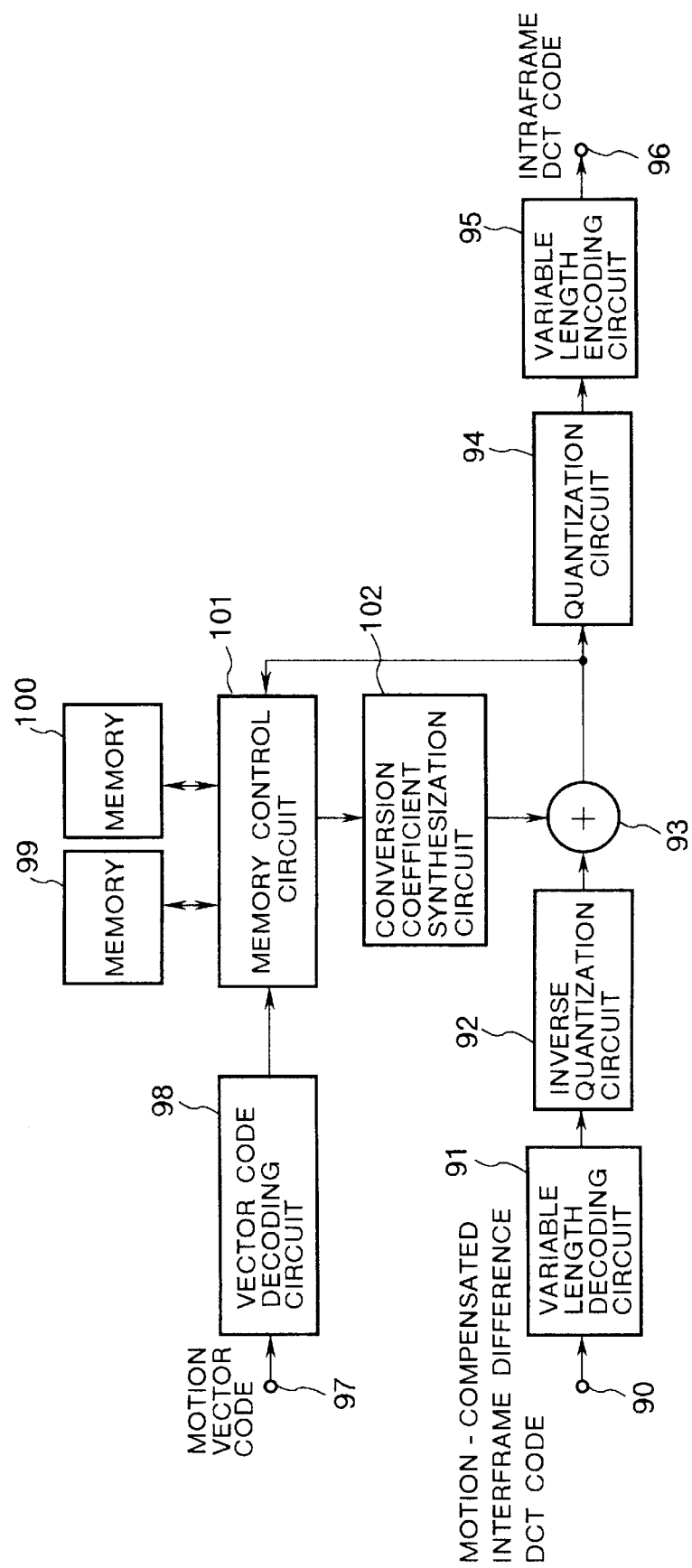
FIG. 9 is a block diagram showing an image processing apparatus according to the fourth embodiment of the present invention.

Referring to FIG. 9, inter-frame motion compensation frame difference DCT code (variable length code) (an intraframe DCT code in the first frame, as is apparent) is input to an input terminal 90. A variable length decoding circuit 91 decodes the variable length code from the input terminal 90. An inverse quantization circuit 92 inversely quantizes the output from the variable length decoding circuit 91. An adder 93 adds the predictive values (conversion coefficients) of the preceding frame to the output from the inverse quantization circuit 92. A quantization circuit 94 quantizes the output from the adder 93. A variable length encoding circuit 95 performs variable length encoding of the output from the quantization circuit 94. The output (target intraframe DCT code) is externally output from an output terminal 96.

The quantization step size of the quantization circuit 94 and the encoding scheme or parameters of the variable length encoding circuit 95 are determined in accordance with a target intraframe DCT code.

A motion vector code accompanying the inter-frame motion compensation frame difference DCT code input to the input terminal 90 is input to an input terminal 97. A vector code decoding circuit 98 decodes the motion vector code from the input terminal 97.

Memories 99 and 100 respectively store the conversion coefficient data of a reference frame and the conversion coefficient data (local decode data) currently undergoing conversion processing. A memory control circuit 101 controls write and read accesses to the memories 99 and 100. A conversion coefficient synthesization circuit 102 synthesizes the conversion coefficient data of the reference data, read out from the memory 99 or 100 by the memory control circuit 101, into conversion coefficient data at the same block position as that of a block belonging to the output data from the inverse quantization circuit 92, and supplies the data to the adder 93. The conversion coefficient synthesization circuit 102 is the most important element of this embodiment, and its function will be described in detail later.

When one of the memories 99 and 100 is used to store the conversion coefficient data of the reference frame, the other memory is used to store the conversion coefficient data (local decode data) currently undergoing conversion processing. The roles of these memories are switched in units of frames. The memory control circuit 101 writes an output from the adder 93 in the memory 99 or 100, and reads out, from the memory 99 (or 100), conversion coefficient data required to restore DCT coefficient differences to DCT coefficient values in accordance with an output from the vector code decoding circuit 98. The memory control circuit 101 then supplies the data to the conversion coefficient synthesization circuit 102.

The overall operation of the embodiment shown in FIG. 9 will be described. Since the first frame has undergone intraframe encoding, no motion vector code is present, and an exceptional operation is performed. The variable length decoding circuit 91 decodes a variable length code from the input terminal 90. The inverse quantization circuit 92 inversely quantizes the output from the circuit 91. Since the output from the inverse quantization circuit 92 has become the DCT coefficient data of original image data, the adder 93 outputs the data output from the inverse quantization circuit 92 without any modification.

The quantization circuit 94 quantizes the output from the adder 93 with an arbitrary quantization step size. The variable length encoding circuit 95 performs variable length encoding of the output from the quantization circuit 94. The output from the variable length encoding circuit 95 is a target intraframe DCT code, which is externally output from the output terminal 96.

The output from the adder 93 is also supplied to the memory control circuit 101 to be written in one of the memories 99 and 100, which is used to store local decode data.

In the second and subsequent frames, the following operation is performed. The variable length decoding circuit 91 decodes a variable length code from the input terminal 90. The inverse quantization circuit 92 inversely quantizes an output from the variable length decoding circuit 91. The output from the inverse quantization circuit 92 has become interframe difference DCT coefficients.

Meanwhile, a motion vector code is input to the input terminal 97. The vector code decoding circuit 98 decodes the motion vector code from the input terminal 97, and supplies the resultant data to the memory control circuit 101. In accordance with this data, the memory control circuit 101 reads out, from one of the memories 99 and 100 which is used to store the conversion coefficient data of a reference frame, all the conversion coefficient data of one or a plurality of conversion coefficient blocks required to restore the interframe difference DCT coefficients currently output from the inverse quantization circuit 92 to intraframe DCT coefficients. The memory control circuit 101 supplies the readout data to the conversion coefficient synthesization circuit 102. The conversion coefficient synthesization circuit 102 calculates, from the conversion coefficient data from the memory control circuit 101, the conversion coefficients of the same conversion coefficient block as a conversion coefficient block to which the interframe difference DCT coefficients currently output from the inverse quantization circuit 92 belongs. The conversion coefficient synthesization circuit 102 supplies the calculated conversion coefficients to the adder 93 in synchronism with the output sequence of the inverse quantization circuit 92.

The adder 93 adds the output from the inverse quantization circuit 92 to the output from the conversion coefficient synthesization circuit 102, and outputs the resultant data. With this operation, the output from the adder 93 has become intraframe DCT coefficients restored from the interframe difference DCT coefficients output from the inverse quantization circuit 92 (the reason for this will be described in detail later). Since the memory control circuit 101 sequentially stores data output from the adder 93 in the memory 99 (or 100), intraframe DCT coefficient data is stored in the memory 99 (or 100), instead of interframe difference DCT coefficients, in any frame. As described above, the memory 99 (or 100) for storing the DCT coefficients of a frame currently undergoing conversion is used as a memory for storing the conversion coefficient data of a reference frame in the next frame.

The quantization circuit 94 quantizes the output from the adder 93 with an arbitrary quantization step size. The variable length encoding circuit 95 performs variable length encoding of the output from the quantization circuit 94. The output from the variable length encoding circuit 95 is a target intraframe DCT code, which is externally output from the output terminal 96.

A method of selecting a conversion coefficient block to be read out from a reference frame will be described next. Although not shown, the memory control circuit 101 has received information indicating the position of a block currently undergoing decoding/encoding processing in a frame. Assume that the block position has block coordinates, i.e., (M, N) in a block unit. The coordinates of a pixel at the upper left of the block are (8M, 8N) in units of pixels. Assume that when a motion vector is represented as (x, y), $$Mc=(8M+x)/8$$

$$Nc=(8N+y)/8$$

where Mc and Nc are integers. The decimal parts of these values are rounded off.

The following are the positions of reference blocks to be selected. When neither of the values x and y can be divided by "8" (case 0), four blocks indicated by (Mc, Nc), (Mc+1, Nc), (Mc, Nc+1), and (Mc+1, Nc+1) are selected. When only the value x cannot be divided by "8" (case 1), the two blocks indicated by (Mc, Nc) and (Mc+1, Nc) are selected. When only the value y cannot be divided by "8" (case 2), the two blocks indicated by (Mc, Nc) and (Mc, Nc+1) are selected. When both the values x an y can be divided by "8" (case 3), the block indicated by (Mc, Nc) is selected.

In this case, variables m and n are defined as follows:

$$m=(8M+x)\%8$$

$$n=(8N+y)\%8$$

where % is the remainder operator and m and n are integers of 0 to 7.

As described above, the memory control circuit 101 selects one to four conversion coefficient blocks in accordance with cases 0 to 3, and reads out the conversion coefficient data of selected blocks from the memory 99 (or 100) in which the conversion coefficient data of a reference frame are stored. The memory control circuit 101 then supplies the data to the conversion coefficient synthesization circuit 102. The memory control circuit 101 also supplies the variables m and n to the conversion coefficient synthesization circuit 102.

The conversion coefficient synthesization circuit 102 calculates conversion coefficient data at each block position required in the adder 93 from the conversion coefficient data from the memory control circuit 101 in the following manner. The conversion coefficient synthesization circuit 102 selects a maximum of four conversion matrices from fourteen 8×8 conversion matrices Li and Ri (i=1 to 7) prepared in advance in accordance with the variables m and n from the memory control circuit 101. For the variable m, a conversion matrix Lm is represented by $P_L$, and a conversion matrix Rm is represented by $P_R$, which will be described in detail later. When m=0, since no conversion matrix is used, no selection is required. For the variable n, a conversion matrix Ln is represented by $Q_L$, and a conversion matrix Rn is represented by $Q_R$. With regard to the variable n as well, when n=0, since no conversion matrix is used, no selection is required.

Figure 10A:
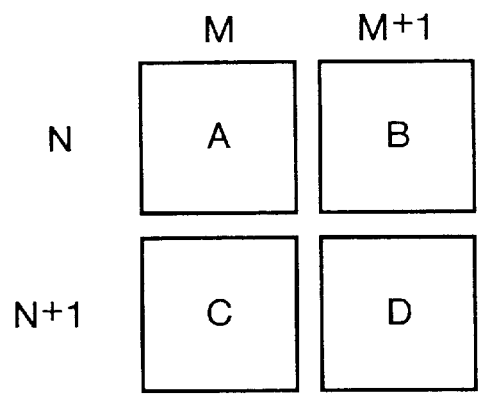
FIGS. 10A to 10D are views for explaining the operation of a conversion coefficient synthesization circuit 102.

Letting E be the conversion coefficient block to be obtained finally, the block E is obtained in accordance with cases 0 to 3 as follows:

In case 0 (in which neither of the values x and y can be divided by "8"), the four conversion coefficient blocks selected previously are referred to as blocks A, B, C, and D, as shown in FIG. 10A. The blocks A, B, C, and D are blocks each constituted by two-dimensional DCT coefficients based on an 8-dimensional DCT basis. According to these blocks and the 8×8 conversion matrices $P_L$, $P_R$, $Q_L$, and $Q_R$ selected in accordance with the variables m and n, the block E to be obtained is given by the following equation:

$$E = (Q_L \cdot A + Q_R \cdot C) P_L^t + (Q_L \cdot B + Q_R \cdot D) P_R^t$$

Figure 10B:
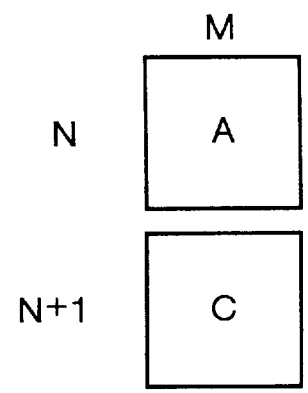

In case 1 (in which only the value x can be divided by "8"), if the two conversion coefficient blocks selected previously are represented by A and C as shown in FIG. 10B, the block E to be obtained is given by the following equation:

$$E = Q_L \cdot A + Q_R \cdot C$$

Figure 10C:
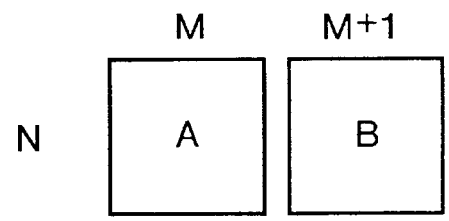

In case 2 (in which only the value y can be divided by "8"), if the two conversion coefficient blocks selected previously are represented by A and B as shown in FIG. 10C, the block E to be obtained is given by the following equation:

$$E = A \cdot P_L^t + B \cdot P_R^t$$

Figure 10D:
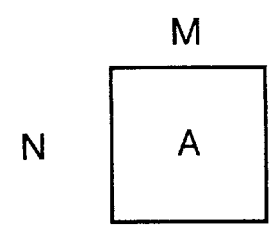

In case 3 (in which both the values x and y can be divided by "8"), if the one conversion coefficient block selected previously is represented by A as shown in FIG. 10D, the block A is the block E to be obtained. That is, $$E = A$$

The reason why the conversion matrices Li and Ri (i=1 to 7) and the blocks $P_L$, $P_R$, $Q_L$, and $Q_R$ are selected will be described next. An 8-dimensional DCT basis function group is given by $$\phi = \{\phi_0, \phi_1, \phi_2, \ldots, \phi_7\}$$

where $\phi_i$ is the 8-dimensional vector consisting of eight discrete values. For $\phi$, sets $\{\sigma_i\}$ and $\{\lambda_i\}$ of function groups are defined as follows:

$$\{\sigma_i\} = \{\sigma_0, \sigma_1, \sigma_2, \ldots, \sigma_7\}$$

$$\{\lambda_i\} = \{\lambda_0, \lambda_1, \lambda_2, \ldots, \lambda_7\}$$

where $\sigma_i$ and $\lambda_i$ are the function groups, respectively. For example, $$\sigma_i = \{\sigma_{i,0}, \sigma_{i,1}, \sigma_{i,2}, \ldots \sigma_{1,7}\}$$

where $\sigma_{i,j}$ is the 8-dimensional vector.

Assume that an arithmetic operation of shifting each element of a given vector $v = (v_0, v_1, \ldots, v_{n-2}, v_{n-1}, v_n)$ to the left by k to obtain $v' = (v_2, v_3, \ldots, v_n, 0, 0)$ is expressed v'=v<<k, and an arithmetic operation of shifting each element of the vector v to the right by k to obtain $v' = (0, 0, v_0, \ldots, v_{n-2})$ is expressed by v'=>>k. With these expressions, $\sigma_{i,j}$ and $\lambda_{i,j}$ are defined as follows:

$$\sigma_{i,j} = \phi_j << i$$

$$\lambda_{i,j} = \phi_j << j$$

By using these expressions, the matrix groups Li and Ri (i=1 to 7) are defined as follows:

$$L_i = \begin{bmatrix} \phi_0 \sigma_{8-i,0} & \cdots & \phi_0 \sigma_{8-i,7} \\ \vdots & \ddots & \vdots \\ \phi_7 \sigma_{8-i,0} & \cdots & \phi_7 \sigma_{8-i,7} \end{bmatrix} \quad (1)$$

$$R_i = \begin{bmatrix} \phi_0 \lambda_{i,0} & \cdots & \phi_0 \lambda_{i,7} \\ \vdots & \ddots & \vdots \\ \phi_7 \lambda_{i,0} & \cdots & \phi_7 \lambda_{i,7} \end{bmatrix}$$

where i=1 to 7.

Target conversion coefficient data can be obtained by using the matrix groups Li and Ri. This operation will be described next. Assume that two spatially continuous 8-pixel areas are represented by A and B, and the DCT coefficient values of the respective areas are given by $$a = (a_0, a_1, a_2, \ldots, a_7)$$

$$b = (b_0, b_1, b_2, \ldots, b_7)$$

Consider the block E having the same size as that of the areas A and B and extending over the two areas. Assume that this block E extends over the areas A and B with 1-k:k. Let e be the DCT coefficient values of the block E. In addition, let Ea be the portion of the block E which overlaps the area A, and Eb be the portion of the block E which overlaps the area B. That is, $$E = Ea + Eb$$

The relationship between these values can be expressed as follows:

$$e = DCT \cdot E^t = \begin{bmatrix} \phi_0 \\ \vdots \\ \phi_7 \end{bmatrix} E^t = \begin{bmatrix} \phi_0 \\ \vdots \\ \phi_7 \end{bmatrix} (E_a + E_b)^t \quad (2)$$

$$E_a = \sum_i a_i \sigma_{8-m,i} \quad (3)$$

$$E_b = \sum_i b_i \lambda_{m,i}$$

Therefore, equation (2) can be modified as follows:

$$\begin{aligned} e &= \begin{bmatrix} \phi_0 \\ \vdots \\ \phi_7 \end{bmatrix} (\sigma_{8-m,0}^t \cdots \sigma_{8-m,7}^t) a^t + \begin{bmatrix} \phi_0 \\ \vdots \\ \phi_7 \end{bmatrix} (\lambda_{m,0}^t \cdots \lambda_{m,1}^t) b^t \\ &= \begin{bmatrix} \phi_0 \sigma_{8-m,0} & \cdots & \phi_0 \sigma_{8-m,7} \\ \vdots & \ddots & \vdots \\ \phi_7 \sigma_{8-m,0} & \cdots & \phi_7 \sigma_{8-m,7} \end{bmatrix} \begin{bmatrix} a_0 \\ \vdots \\ a_7 \end{bmatrix} + \\ &\quad \begin{bmatrix} \phi_0 \lambda_{m,0} & \cdots & \phi_0 \lambda_{m,7} \\ \vdots & \ddots & \vdots \\ \phi_7 \lambda_{m,0} & \cdots & \phi_7 \lambda_{m,7} \end{bmatrix} \begin{bmatrix} b_0 \\ \vdots \\ b_7 \end{bmatrix} \\ &= L_m \begin{bmatrix} a_0 \\ \vdots \\ a_7 \end{bmatrix} + R_m = \begin{bmatrix} b_0 \\ \vdots \\ b_7 \end{bmatrix} \end{aligned} \quad (4)$$

As described above, the conversion coefficients e of the area E extending over the areas A and B can be obtained from the conversion coefficients a and b of the areas A and B on one dimension. The conversion formulae described above in conjunction with cases 0 to 3 are obtained by extending the conversion formulae described here to a two-dimensional DCT.

As described in this embodiment, inter-frame motion compensation frame difference DCT encoded data can be converted into intraframe DCT encoded data without performing inverse DCT and DCT processing. It is obvious that the embodiment can be applied to conversion to encoded data of an n-JPEG scheme.

FIG. 11 is a block diagram showing an image processing apparatus according to the fifth embodiment of the present invention.

Referring to FIG. 11, an inter-frame motion compensation frame difference DCT code (variable length code) (an intraframe DCT code in the first frame, as in the previous embodiment) is input to an input terminal 110. A variable length decoding circuit 111 decodes the variable length code from the input terminal 110. An inverse quantization circuit 112 inversely quantizes the output from the variable length decoding circuit 111. An adder 113 adds the predictive values (conversion coefficients) of the preceding frame to the output from the inverse quantization circuit 112. A quantization circuit 114 quantizes the output from the adder 113. A variable length encoding circuit 115 performs variable length encoding of the output from the quantization circuit 114. The output (target intraframe DCT code) from the variable length encoding circuit 115 is externally output from an output terminal 116.

The quantization step size of the quantization circuit 114 and the encoding scheme and parameters of the variable length encoding circuit 115 are determined in accordance with a target intraframe DCT code.

A motion vector code accompanying the inter-frame motion compensation frame difference DCT code input to the input terminal 110 is input to an input terminal 117. A vector code decoding circuit 118 decodes the motion vector code from the input terminal 117.

Memories 119 and 120 respectively store the image data of a reference frame and the image data (local decode data) of a frame currently undergoing conversion processing according to the form of intraframe encoded data. A memory control circuit 121 controls read and write accesses to the memories 119 and 120. A variable length decoding circuit 122 performs variable length encoding of the encoded data of the reference frame read out from the memory 119 or 120 by the memory control circuit 121. An inverse quantization circuit 123 inversely quantizes the output from the variable length decoding circuit 122. The variable length decoding circuit 122 corresponds to the variable length encoding circuit 115; and the inverse quantization circuit 123, the quantization circuit 114.

A conversion coefficient synthesization circuit 124 synthesizes, from the output from the inverse quantization circuit 123, conversion coefficient data at the same block position as that of a block to which the output data from the inverse quantization circuit 112 belongs. The conversion coefficient synthesization circuit 124 then supplies the data to the adder 113. The function of the conversion coefficient synthesization circuit 124 is basically the same as that of the conversion coefficient synthesization circuit 102 in the fourth embodiment shown in FIG. 9.

Similar to the memories 99 and 100 (see FIG. 9), one of the memories 119 and 120 stores the data of the reference frame, and the other memory stores the data (local decode data) currently undergoing conversion processing. The roles of these memories are switched in units of frames. The memories 99 and 100 are used to store conversion coefficient data, whereas the memories 119 and 120 are used to store intraframe encoded data. Therefore, the memories 119 and 120 can have storage capacities smaller than those of the memories 99 and 100. The memory control circuit 121 sequentially writes data output from the variable length encoding circuit 115 in the memories 119 and 120 without giving any consideration to the original block boundaries. In addition, the memory control circuit 121 reads out encoded data from the memory 119 (or 120) in which the encoded data of the reference frame is stored, in accordance with the output from the vector code decoding circuit 118, and supplies the readout data to the variable length decoding circuit 122.

The overall operation of the embodiment shown in FIG. 11 will be described. Similar to the embodiment shown in FIG. 9, since the first frame has undergone intraframe encoding, no motion vector is present, and an exceptional operation is performed. The variable length decoding circuit 111 decodes a variable length code from the input terminal 110. The inverse quantization circuit 112 inversely quantizes the output from the variable length decoding circuit 111. The output from the inverse quantization circuit 112 has become the DCT coefficient data of original image data, and the adder 113 outputs the data output from the inverse quantization circuit 112 without any modification.

The quantization circuit 114 quantizes the output from the adder 113 with an arbitrary quantization step size. The variable length encoding circuit 115 performs variable length encoding of the output from the quantization circuit 114. The output from the variable length encoding circuit 115 is a target intraframe DCT code, which is output outside from the output terminal 116, and is sequentially written in the memory 119 or 120 by the memory control circuit 121.

In the second and subsequent frames, the following operation is performed. The variable length decoding circuit 111 decodes a variable length code from the input terminal 110. The inverse quantization circuit 112 inversely quantizes an output from the variable length decoding circuit 111. The output from the inverse quantization circuit 112 has become interframe difference DCT coefficients.

Meanwhile, a motion vector code is input to the input terminal 117. The vector code decoding circuit 118 decodes the motion vector code from the input terminal 117, and supplies the resultant data to the memory control circuit 121. In accordance with this data, the memory control circuit 121 reads out a plurality of encoded data from one of the memories 119 and 120 in which the intraframe encoded data of the reference frame is stored, and supplies the readout data to the variable length decoding circuit 122. A method of determining data to be read out from the memories 119 and 120 will be described later. The variable length decoding circuit 122 decodes the variable length code. The inverse quantization circuit 123 inversely quantizes the output from the variable length decoding circuit 122. The output from the inverse quantization circuit 123 has become the conversion coefficient data of the reference frame.

Similar to the conversion coefficient synthesization circuit 102 (see FIG. 9), the conversion coefficient synthesization circuit 124 calculates, from the conversion coefficient data from the inverse quantization circuit 123, the conversion coefficients of the same conversion coefficient block as a conversion coefficient block to which the interframe difference DCT coefficients currently output from the inverse quantization circuit 112 belong. The conversion coefficient synthesization circuit 124 then supplies the conversion coefficients to the adder 113 in synchronism with the output sequence of the inverse quantization circuit 112.

The adder 113 adds the output from the inverse quantization circuit 112 to the output from the conversion coefficient synthesization circuit 124, and outputs the resultant data. With this operation, the output from the adder 113 has become intraframe DCT coefficients restored the DCT coefficients of the interframe difference DCT coefficients output from the inverse quantization circuit 112, as in the case of the adder 93 (see FIG. 9).

The quantization circuit 114 quantizes the output from the adder 113 with an arbitrary quantization step size. The variable length encoding circuit 115 performs variable length encoding of the output from the quantization circuit 114. The output from the variable length encoding circuit 115 is a target intraframe DCT code, which is externally output from the output terminal 116.

The memory control circuit 121 sequentially stores the data output from the variable length encoding circuit 115 in the memory 119 (or 120) which is used to store local decode data. With this operation, an intraframe DCT coefficient code of any frame is stored in the memory 119 (or 120) in any frame. As described above, the memory 119 (120) currently used to store the DCT coefficients of a frame currently undergoing conversion processing is used as a memory for storing the encoded data of a reference frame in the next frame.

A method of determining a plurality of encoded data to be read out from the memory 119 (or 120) in which the encoded data of a reference frame is stored will be described below. Since the encoded data of the reference frame varies in word length for each block, data cannot be uniquely determined with respect to a space. However, since a unique code for identifying a block is always attached to the start and/or end of the block, the encoded data of an arbitrary block can be extracted with reference to this code. Assume that, similar to the fourth embodiment shown in FIG. 9, variables M, N, Mc, and Nc representing block positions are defined, and the number of blocks in the lateral direction of the image is K. In this case, in accordance with cases 0 to 3, encoded data to be supplied to the variable length decoding circuit 122 can be determined as follows.

In case 0, the memory contents are skipped first by (K·Nc+Mc) to read out the encoded data of the two subsequent blocks, and then are skipped by (B−2) to read out the encoded data of the two subsequent blocks. The readout encoded data of the blocks are supplied to the variable length decoding circuit 122.

In case 1, the memory contents are skipped first by (K·Nc+Mc) to read out the encoded data of the subsequent block, and then are skipped by (B−1) to read out the encoded data of the subsequent block. The readout encoded data of the blocks are supplied to the variable length decoding circuit 122.

In case 2, the memory contents are skipped first by (K·Nc+Mc) to read out the encoded data of the two subsequent blocks. The readout encoded data of the blocks are supplied to the variable length decoding circuit 122.

In case 3, the memory contents are skipped first by (K·Nc+Mc) to read out the encoded data of the subsequent block. The readout encoded data of the block is supplied to the variable length decoding circuit 122.

With such skipping operations, the encoded data of all the conversion coefficient data required in the conversion coefficient synthesization circuit 124 are read out from the memory 119 (or 120). The readout encoded data are converted into conversion coefficient data by the variable length decoding circuit 122 and the inverse quantization circuit 123. The resultant data are then supplied to the conversion coefficient synthesization circuit 124. The conversion coefficient synthesization circuit 124 operates in the same manner as the conversion coefficient synthesization circuit 102 (see FIG. 9), and supplies the conversion coefficient data of the reference frame to the adder 113.

In this embodiment, since both reference frame data and local decode data are stored in the memories 119 and 120 in the form of codes, the required memory capacity is very small. Furthermore, in comparison with a scheme of storing reference frame data as spatial image data after inverse DCT processing, the memory capacity can be reduced at the same ratio as the intraframe encoding efficiency. That is, if the compression ratio of the intraframe encoding is $1/20$, the memory capacity can be reduced to $1/20$.

FIG. 12 is a block diagram showing an image processing apparatus according to the sixth embodiment of the present invention. In this embodiment, an inter-frame motion compensation frame difference DCT code is converted into a non-frame motion compensation frame difference DCT code. The arrangement shown in FIG. 12 will be described. An inter-frame motion compensation frame difference DCT code (variable length code) (an intraframe DCT code in the first frame, as in the previous embodiment) is input to an input terminal 130. A variable length decoding circuit 131 decodes the variable length code from the input terminal 130. An inverse quantization circuit 132 inversely quantizes the output from the variable length decoding circuit 131. An adder 133 adds the predictive values (conversion coefficients) of the preceding frame to the output from the inverse quantization circuit 132. A subtracter 134 subtracts the conversion coefficient data from the output from the adder 133. A quantization circuit 135 performs quantization of the output from the subtracter 134. A variable length encoding circuit 136 performs variable length encoding of the output from the quantization circuit 135. The output (target inter-motion compensation frame difference DCT code) from the variable length encoding circuit 136 is externally output from an output terminal 137.

The quantization step size of the quantization circuit 135 and the encoding scheme and parameters of the variable length encoding circuit 136 are determined in accordance with a target interframe difference DCT code.

A motion vector code accompanying the inter-motion compensation frame difference DCT code input to the input terminal 130 is input to an input terminal 138. A vector code decoding circuit 139 decodes the motion vector code from the input terminal 138.

Memories 140 and 141 respectively store the conversion coefficient data of a reference frame and the conversion coefficient data (local decode data) currently undergoing conversion processing. A memory control circuit 142 controls write and read accesses to the memories 140 and 141. A conversion coefficient synthesization circuit 143 synthesizes the conversion coefficient data of the reference frame read out from the memory 140 or 141 into conversion coefficient data at the same block position as that of a block to which the output data from the inverse quantization circuit 132 belongs. The conversion coefficient synthesization circuit 143 then supplies the data to the adder 133. The conversion coefficient synthesization circuit 143 operates in exactly the same manner as the conversion coefficient synthesization circuit 102 in the fourth embodiment shown in FIG. 9.

The memories 140 and 141 are used in exactly the same manner as the memories 99 and 100 (see FIG. 9). That is, while one of the memories 140 and 141 is used to store the conversion coefficient data of the reference frame, the other memory is used to store the conversion coefficient data (local decode data) currently undergoing conversion processing. The roles of these memories are switched in units of frames.

Similar to the memory control circuit 101 (see FIG. 9), the memory control circuit 142 writes the output from the adder 133 in the memory 140 or 141, and reads out conversion coefficient data required to restore DCT conversion coefficient differences to DCT conversion coefficients from the memory 140 (or 141) in accordance with the output from the vector code decoding circuit 139. The memory control circuit 142 supplies the readout data to the conversion coefficient synthesization circuit 143. The memory control circuit 142 also outputs the conversion coefficient data of the same encoded block in the reference frame to the subtracter 134 in synchronism with the output from the adder 133.

The overall operation of the embodiment shown in FIG. 12 will be described. Since the first frame has undergone intraframe encoding, no motion vector code is present, and an exceptional operation is performed. The variable length decoding circuit 131 decodes a variable length code from the input terminal 130. The inverse quantization circuit 132 inversely quantizes the output from the variable length decoding circuit 131. Since the output from the inverse quantization circuit 132 has become the DCT coefficient data of the original image data, the adder 133 outputs the data output from the inverse quantization circuit 132 without any modification. The subtracter 134 also outputs the data output from the adder 133 without any modification.

The quantization circuit 135 quantizes the output from the adder 133 with an arbitrary quantization step size. The variable length encoding circuit 136 performs variable length encoding of the output from the quantization circuit 135. The output from the variable length encoding circuit 136 has become an intraframe DCT code because of the first frame. This data is then externally output from the output terminal 137.

The output from the adder 133 is also supplied to the memory control circuit 142 to be written in one of the memories 140 and 141, which is used to store the local decode data.

In the second and subsequent frames, the following operation is performed. The variable length decoding circuit 131 decodes a variable length code from the input terminal 130. The inverse quantization circuit 132 inversely quantizes an output from the variable length decoding circuit 131. The output from the inverse quantization circuit 132 has become interframe difference DCT coefficients.

Meanwhile, a motion vector code is input to the input terminal 138. The vector code decoding circuit 139 decodes the motion vector code from the input terminal 138, and supplies the resultant data to the memory control circuit 142. In accordance with this data, similar to the memory control circuit 101 (see FIG. 9), the memory control circuit 142 reads out, from one of the memories 140 and 141 which is used to store the conversion coefficient data of a reference frame, all the conversion coefficient data of one or a plurality of conversion coefficient blocks required to restore the interframe difference DCT coefficients currently output from the inverse quantization circuit 132 to intraframe DCT coefficients. The memory control circuit 142 supplies the readout data to the conversion coefficient synthesization circuit 143. The conversion coefficient synthesization circuit 143 calculates, from conversion coefficient data from the memory control circuit 142, the conversion coefficients of the same conversion coefficient block as a conversion coefficient block to which the interframe difference DCT coefficients currently output from the inverse quantization circuit 132 belongs. The conversion coefficient synthesization circuit 143 supplies the calculated conversion coefficients to the adder 133 in synchronism with the output sequence of the inverse quantization circuit 132.

The adder 133 adds the output from the inverse quantization circuit 132 to the output from the conversion coefficient synthesization circuit 143, and outputs the resultant data. With this operation, the output from the adder 133 has become intraframe DCT coefficients restored from the interframe difference DCT coefficients output from the inverse quantization circuit 132. Since the memory control circuit 142 sequentially stores data output from the adder 133 in the memory 140 (or 141), intraframe DCT coefficient data is stored in the memory 140 (or 141), instead of interframe difference DCT coefficients, in any frame. As described above, the memory 140 (or 141) for storing the DCT coefficients of a frame currently undergoing conversion is used as a memory for storing the conversion coefficient data of a reference frame in the next frame.

In addition, the memory control circuit 142 reads out, from the reference frame, the conversion coefficient data of a block at the same position as that of the encoded block output from the adder 133, and supplies the readout data to the subtracter 134. The subtracter 134 subtracts the conversion coefficient data from the output from the adder 133. With this operation, the output from the subtracter 134 has become non-inter-motion compensation frame difference DCT coefficients.

The quantization circuit 135 quantizes the output from the subtracter 134 with an arbitrary quantization step size. The subtracter 134 performs variable length encoding of the output from the quantization circuit 135. The output from the variable length encoding circuit 136 is a target interframe motion compensation frame difference DCT code, which is externally output from the output terminal 137.

Various modifications and changes can be made without departing from the spirit and scope of the invention.

For example, the above embodiments have exemplified only intraframe and interframe encoding and decoding. However, the present invention can be equally applied to intrafield and interfield encoding and decoding and combinations of intraframe/interframe and intrafield/interfield encoding and decoding.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) input means for inputting image data coded by using orthogonal transformation;
   b) decoding means for decoding the input image data into orthogonal transform coefficient data;
   c) generation means for generating interpicture difference orthogonal transform coefficient data from the orthogonal transform coefficient data decoded by said decoding means and the orthogonal transform coefficient data of an adjacent image; and
   d) encoding means for encoding the interpicture difference orthogonal transform coefficient data output from said generation means.

2. An apparatus according to claim 1, wherein the image data comprises data which have been intrapicture-encoded.

3. An apparatus according to claim 2, wherein said input means includes decoding means for decoding the intrapicture encoded image data into orthogonally transformed data.

4. An image processing apparatus comprising:
   a) input means for inputting image data encoded by interpicture block-encoding;

b) decoding means for decoding the encoded data input by said input means into orthogonal transform coefficient data of interpicture difference data; and c) forming means for forming intrapicture-encodable orthogonal transform coefficient data from the orthogonal transform coefficient data of interpicture difference data decoded by said decoding means.

5. An apparatus according to claim 4, further comprising conversion means for performing inverse orthogonal transformation of data output from said forming means.

6. An apparatus according to claim 5, further comprising display means for displaying data converted by said conversion means.

7. An apparatus according to claim 4, further comprising encoding means for performing interpicture encoding of data output from said forming means.

8. An image processing apparatus comprising:

a) input means for inputting image data coded by using orthogonal transformation;

b) decoding means for decoding the input image data into orthogonal transform coefficient data;

c) detection means for detecting a motion of an image from the orthogonal transform coefficient data decoded by said decoding means; and d) coding means for performing motion compensation encoding of the orthogonal transform coefficient data in accordance with an output from said detection means.

9. An image processing apparatus comprising:

a) input means for inputting encoded image data encoded by using differences therebetween;

b) decoding means for decoding the input encoded image data into orthogonal transform coefficient data;

c) storage means for storing reference image data;

d) extraction means for extracting reference image data corresponding to the orthogonal transform coefficient data decoded by said decoding means, from the reference image data stored in said storage means;

e) synthesization means for synthesizing transform coefficient data used to obtain the differences of the image data, from the reference image data extracted by said extraction means and the orthogonal transform coefficient data decoded by said decoding means; and f) encoding means for encoding the image data by using the transform coefficient data synthesized by said synthesization means.

10. An apparatus according to claim 9, wherein said storage means stores orthogonal transform coefficient data output from said synthesization means.

11. An apparatus according to claim 9, wherein said storage means stores the data encoded by said encoding means.

12. An apparatus according to claim 9, wherein the encoded data input by said input means is data having undergone motion compensation interframe encoding, motion compensation data is also input by said input means together with the encoded data, and said extraction means extracts image data on the basis of the motion compensation data.

13. An apparatus according to claim 10, wherein the encoded data input by said input means is data having undergone motion compensation interframe encoding, motion compensation data is also input by said input means together with the encoded data, and said extraction means extracts image data on the basis of the motion compensation data.

14. An apparatus according to claim 11, wherein the encoded data input by said input means is data having undergone motion compensation interframe encoding, motion compensation data is also input by said input means together with the encoded data, and said extraction means extracts image data on the basis of the motion compensation data.

15. An image processing method comprising the steps of:

inputting image data coded by using orthogonal transformation;

decoding the input image data into orthogonal transform coefficient data;

generating interpicture difference orthogonal transform coefficient data from the orthogonal transform coefficient data decoded by said decoding step and the orthogonal transform coefficient data of an adjacent image; and encoding the interpicture difference orthogonal transform coefficient data output from the generating step.

16. An image processing method comprising the steps of:

inputting image data coded by using orthogonal transformation;

decoding the input image data into orthogonal transform coefficient data;

detecting a motion of an image from the orthogonal transform coefficient data decoded by said decoding step; and performing motion compensation encoding of the orthogonal transform coefficient data in accordance with a detection result of said detection step.

17. An image processing method comprising the steps of:

inputting encoded image data encoded by using differences therebetween;

decoding the input encoded image data into orthogonal transform coefficient data;

storing reference image data;

extracting reference image data, corresponding to the orthogonal transform coefficient data decoded by said decoding step, from the reference image data stored in said storing step;

synthesizing transform coefficient data used to obtain the differences of the image data, from the reference image data extracted in the extracting step and the orthogonal transform coefficient data decoded in said decoding step; and encoding the image data by using the transform coefficient data synthesized in said synthesizing step.

* * * * *

UNITED STATES PATENT AND TRADEMARK OFFICE
CERTIFICATE OF CORRECTION

PATENT NO. : 6,038,345
DATED : March 14, 2000
INVENTOR(S) : Hidefumi Osawa, et al.

It is certified that error appears in the above-identified patent and that said Letters Patent is hereby corrected as shown below:

Column 3:
Line 35, "difference" should read --different--.
Line 36, "coincides" should read --coincide--.

Column 8:
Line 37, "of" should read --from--.

Column 9:
Line 42, "$\{\delta_1\}$"

Should read

--$\{\delta_i\}$--.

Line 51,

"$\delta_i = \{\delta_{i,0}, \delta_{i,1}, \delta_{i,2}, \ldots \delta_{1,7}\}$"

Should read,

--$\delta i = \{\delta_{i,0}, \delta_{i,1}, \delta_{i,2}, \ldots \delta_{i,7}\}$--.

UNITED STATES PATENT AND TRADEMARK OFFICE
CERTIFICATE OF CORRECTION

PATENT NO. : 6,038,345
DATED : March 14, 2000
INVENTOR(S) : Hidefumi Osawa, et al.

It is certified that error appears in the above-identified patent and that said Letters Patent is hereby corrected as shown below:

Column 14:
Line 13, "non-frame" should read --non-inter-fram motion--.

Column 16:
Line 20, "non-inter-motion" should read --Non-inter-frame motion--.
Line 42, "fall" should read --as fall--.

Signed and Sealed this

Twenty-fourth Day of July, 2001

*Attest:*

*Attesting Officer*

NICHOLAS P. GODICI
*Acting Director of the United States Patent and Trademark Office*